Dec. 14, 1954     C. E. BARCLAY ET AL     2,696,933
APPARATUS FOR DUSTING
Filed Dec. 29, 1950     2 Sheets-Sheet 1
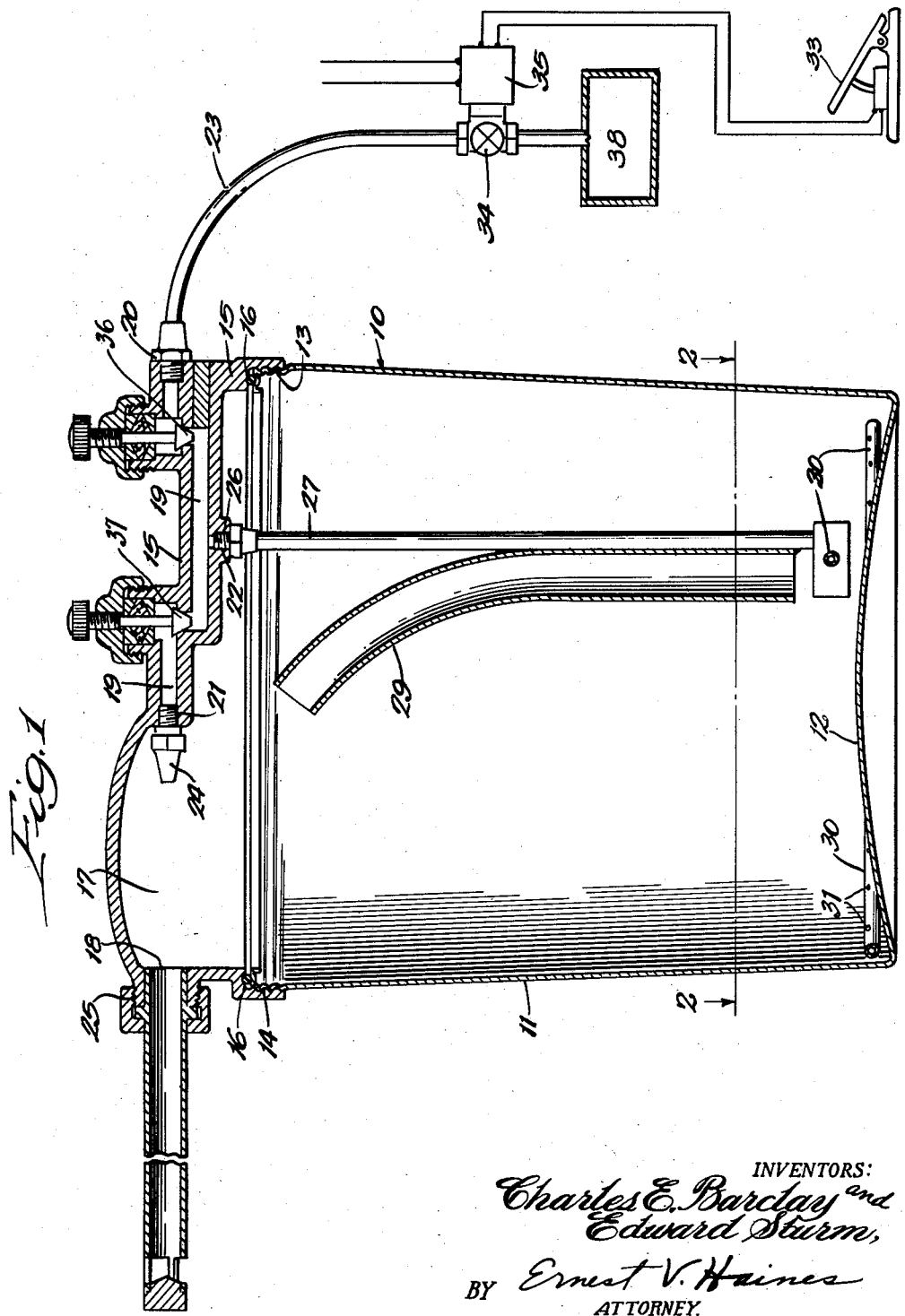
INVENTORS:
Charles E. Barclay and
Edward Sturm,
BY Ernest V. Haines
ATTORNEY.

Dec. 14, 1954
C. E. BARCLAY ET AL
2,696,933
APPARATUS FOR DUSTING
Filed Dec. 29, 1950
2 Sheets-Sheet 2
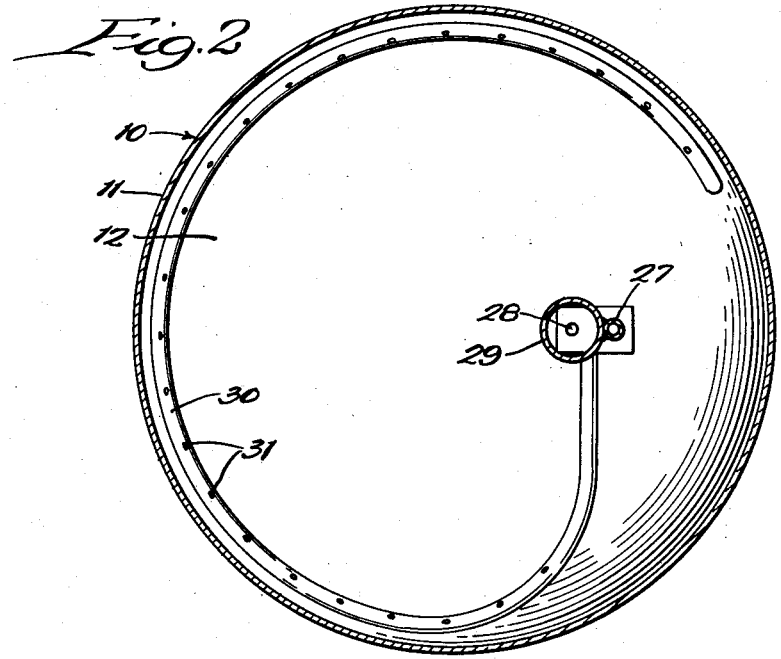
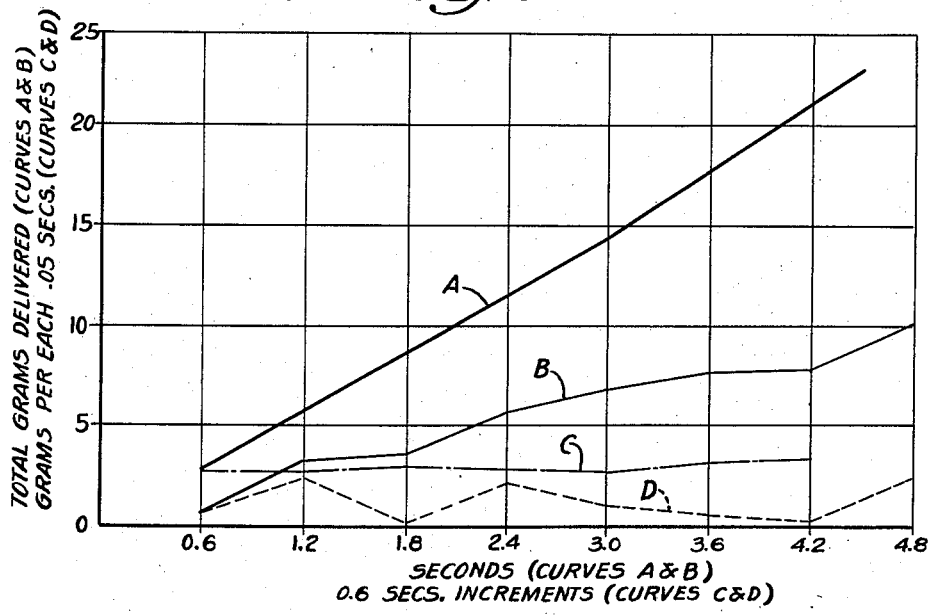
INVENTORS:
Charles E. Barclay and
Edward Sturm,
BY Ernest V. Haines
ATTORNEY.

United States Patent Office 2,696,933
Patented Dec. 14, 1954

2,696,933

APPARATUS FOR DUSTING

Charles E. Barclay and Edward Sturm, Chicago, Ill., assignors to International Minerals & Chemical Corporation, a corporation of New York Application December 29, 1950, Serial No. 203,430

7 Claims. (Cl. 222—70)

This invention relates to the treating of fowl with agents which enhance the natural flavors thereof. More particularly, it relates to methods and apparatus for dispensing uniform quantities of powder. Still more particularly, it relates to apparatus for dusting of fowl with alkali metal salts of L-glutamic acid.

In recent years, the use of flavor intensifiers such as monosodium glutamate have become common in the commercial preparation of foods. Inasmuch as monosodium glutamate is water-soluble, control of the glutamate in solution and the quantity incorporated into fowl is under effective control.

Wet processing, however, is not considered economical for fowl because of the increased processing costs. The added expense is incurred particularly for labor cost. Solutions must be prepared, standardized, and have the proper concentration of glutamate maintained during treatment. In addition, there is an increased handling of fowl from soaking pit to drainage board prior to packing.

Another method of incorporating flavoring compounds is the so-called "dry curing process," wherein the material whose flavor is to be enhanced, is repeatedly hand-rubbed with curing compounds, washed and permitted to drain. The animal flesh so treated is then packed with additional amounts of curing compounds and is permitted to cure for a required length of time. Such a process is time-consuming and not economically feasible where it is desired to impregnate the fresh meat with a flavor intensifier such as monosodium glutamate. Another draw-back to this system is the failure to give a flavoring which is uniform for all of the fowl processed.

It is an object, therefore, of the present invention to overcome the limitations and the disadvantages of above described processes.

It is an object of this invention to provide a simple and economical method of impregnating uncooked flesh of fowl with monosodium glutamate.

It is another object to provide an apparatus for injecting seasoning powders and flavor intensifiers into the cavity of fowl.

It is another object to provide a method wherein the proper amount of monosodium glutamate is deposited in a fowl, and the seasoning takes place during storage.

These and other objects of the invention will be apparent to those skilled in the art from the following description.

It has been discovered that dusting of the cavity of the fowl with uniform quantities of powdered monosodium glutamate will produce uniform flavoring in the comparable fleshy parts of the animal.

This uniform dusting is accomplished by aerating a bulk mass of powder of relatively uniform particle size in an enclosed space and entraining aerated powder in an isolated gaseous stream of small cross sectional area compared to the aerated mass, discharging the stream of an entrained powder into the effective zone of an auxiliary gaseous stream moving transversely to the direction of the powder entraining stream, and outwardly from the enclosed space.

In carrying out the method, the quantity of powder dispensed is directly related to powder particle size and the gas pressure. The larger the particle size, the higher the pressure on the gas or air necessary to move the powder. Where the bulk of a mass of powder ranges in size between about 100 and about 200 mesh, the pressure in the range of approximately 12 to approximately 20 pounds per square inch absolute is the effective range for dispensing of uniform quantities of the powder. Where the powder is of large particle size, the effective pressure range of approximately 20 to approximately 30 pounds per square inch absolute is generally utilized.

When handling powders which are relatively resistant to oxidation through contact with air, compressed air provides a relatively inexpensive gas medium. If the powdered product to be dispensed is readily oxidizable, compressed substantially oxygen-free gases such as carbon dioxide, nitrogen, combustion products of controlled combustion of natural gas, and the like, may be substituted for compressed air.

Referring to the drawings, wherein there is illustrated a preferred form of apparatus for carrying out the above method of dusting fowls, and a graph illustrating comparative results obtained through tests of prior apparatus and the apparatus of the instant invention.

Figure 1 is a vertical sectional view.

Figure 2 is a sectional view along the line 2—2 of Figure 1.

Figure 3 is a graph showing the quantities of powder delivered per units of time.

Briefly, the apparatus of the invention comprises as essential elements a housing provided with inlet means for powder and for air and a common outlet for said materials, air conduit means having an air orifice therein, a tubular member having its lower end positioned adjacent said orifice, and adapted to receive air therefrom, and its upper end directing material flowing therethrough toward the common outlet, and air distributing means at the bottom of said housing.

The housing may be of any design and capacity desired, providing the chamber can be rendered air-tight, except for the common outlet for air and powder. In practice, a cylindrical cup or base is preferred. Such a cup may be provided with a top or closure means rendered air-tight by suitable gasketing and secured to the cup by suitable releasable means such as threads, clamps, bolts, and the like.

The closure means generally is provided with a port which is adapted to be the common outlet for powder and air. This port may communicate with a nozzle of suitable length, said nozzle being attached to the closure means by suitable joining means such as a threaded connection, welding, soldering, and the like. The interior end of the port communicates with a recess in the closure means. At the opposite side of the recess from the port, and directed towards the outlet port, is a nozzle through which controlled amounts of air may be discharged.

An air inlet to the chamber may be provided either in the base or in the closure means. Preferably, the air inlet is in the closure means, thus simplifying the base construction. The air inlet in its simplest form consists of a bore in the closure means provided with internal threads adapted at one end to receive a coupling for an air conduit which extends outside the chamber, and at the other end to receive a threaded air conduit.

The length of air conduit depends upon the positioning of the air inlet and the length of the chamber. Where the air inlet is in the closure means, the conduit means takes the form of a pipe depending from the cap. The depending pipe is adapted, in that portion adjacent the bottom of the chamber, to provide an orifice faced in an upwardly direction designed to jet gas of velocity higher than utilized for aerating the mass of powder.

The tubular member is generally a length of tubing having a diameter which is only a small fraction of the diameter of the chamber. Positioning of this tubular member is fixed by a spider support, or the like, if there is no depending air conduit within the cup or base. On the other hand, where the air conduit is suspended from the closure member, the tubular member may be positioned by attachment to the air conduit through suitable means such as soldering, brazing, and the like. For most efficient operation, the tubular member is straight in that portion into which the orifice directs the air flow. In that portion removed from the orifice the tubular member is curved, preferably in a smooth curve of less than 45°, in order to direct the air and entrained powder toward the common outlet for the chamber.

One of the chief difficulties encountered in dispensing powder has been the failure of the dispensing unit to discharge more than a minor portion of the powder in the chamber. An orifice discharging into a tubular member apparently picks up powder standing as an inverted cone with the apex at or adjacent the orifice. This powder is often no more than a third of the powder in the container. Unless expensive mechanical devices are built into stationary chambers, or unless portable chambers are manually manipulated, not only is the quantity of powder small, but that delivered is erratic as to quantity per unit of time.

The air distributing unit, which makes it possible to deliver 85% or more of the powder from either portable or stationary dispensing units, comprises tubular means positioned in the bottom of the base or resting on or adjacent the bottom of the base. The tubular means may be shaped in the form of a circle, preferably adjacent the perimeter of the interior of the bottom of the base, or in the form a spiral, figure S, or equivalent configuration.

The tubular means is provided with a multiplicity of ports or orifices. The diameter of the ports will vary with the number of ports and the volume of air needed to aerate the mass of air standing in the chamber. In general, it is preferred to balance the air volume so that the ports will have a diameter in the range of between about $1/128$ and about $1/32$ of an inch.

The invention will be more fully understood by reference to a preferred embodiment of the invention as illustrated in conjunction with a portable apparatus.

Referring to Figures 1 and 2, a cup is indicated by the numeral 10. Cup 10 is provided with a circular wall 11 closed at the bottom by a concave base 12. Circular wall 11 is externally threaded as at 13 with threads adapted to be engaged by threads 14 of a cap or cover 15. Closure is rendered air-tight between cup 10 and cap 15 by suitable sealing means 16, such as a gasket, O-ring, or the like.

Cap 15 is provided with a cavity 17 and bores 18 and 19. Bore 19 is adapted with an inlet 20 and outlets 21 and 22. The inlet 20 and outlets 21 and 22 are adapted with suitable attachment means such as threads, shoulders for slip-on connections, and the like. Secured to the inlet 20 is a conduit 23 for delivery of air from a source of compressed air 38, which may be a reservoir or surge tank of a compressor, or a compressor. Secured in outlet 21 is a nozzle 24 adapted to direct air flow toward bore 18. Cap 15 is externally threaded as at 25 for attachment of a powder delivery nozzle of suitable configuration.

Outlet 22 is internally threaded as at 26. Mounted in outlet 26, by means of cooperating threads, is an air conduit 27 provided with orifice 28. Secured to air conduit 27, as by soldering, is a tubular member 29, adapted in axial alignment with the jet of gas from orifice 28 so that entrained powder and gas is moved through member 29.

Positioned on the bottom 12 of cup 10 is an air distributing means 30 in the form of small tubing having a multiplicity of ports 31. Distributing means 30 is supplied with air from conduit 27 by a suitable tubular lead line 32.

Gas flow through conduit 23 is controlled by suitable control means such as a foot pedal 33 and valve means 34 whose operation is controlled by an electrical timer 35 designed for automatic shut-off after the valve has been open for the set period of time within cap 15, gas below is controlled by valves 36 and 37. Valve 36 controls gas flow within the dispensing unit, while valve 37 controls merely the gas issuing through nozzle 24.

The apparatus of this invention discharges 85% or better of the powder in the cup when the entrainment orifice 28 is positioned in or adjacent bottom 12 of cup 10. In addition, until the powder supply available for delivery approaches depletion, the delivery of powder per unit of time is substantially constant. The constant delivery is a feature of the invention which is necessary for uniform dusting operations.

The difference between performance of earlier devices and the apparatus of the instant invention is illustrated by the following data obtained as follows: the apparatus was operated first under 15 pounds per square inch absolute air pressure with the air distributing means 30 removed, and the port connecting to said means 30 plugged to prevent escape of air except through orifice 28. The cup contained 1,000 grams of powder initially. Data on the quantity of powder delivered per unit of time is given in column II following.

The apparatus assembled as shown in Figures 1 and 2 was operated at 15 pounds pressure, connected to the same surge tank which was utilized for air supply when obtaining the data of column I. The identical quantity of powder was placed in the cup, namely 1,000 grams. The data on quantity of powder delivered per unit of time is given in column II. The data of columns I and II appear as curves A and B, respectively, of Figure 3.

| Time (Seconds) | Amount Delivered (Without the Aerator Ring) | Amount Delivered (With Aerator Ring and Jet 24 Closed) |
|---|---|---|
| | Grams | Grams |
| 0.6 | 0.75 | 2.9 |
| 1.2 | 3.3 | 5.7 |
| 1.8 | 3.6 | 8.8 |
| 2.4 | 5.7 | 11.7 |
| 3.0 | 6.9 | 14.4 |
| 3.6 | 7.6 | 17.7 |
| 4.2 | 7.8 | 21.2 |
| 4.8 | 10.1 | |

The increments of powder delivered is illustrated graphically in Figure 3, curves C and D, respectively. From this graph it may be seen by a study of curves C and D that the quantity of powder delivered by previous apparatus (curve C) is not uniform. A study of curve D, based upon the data in column III, discloses that the quantity of powder delivered by the apparatus of the instant invention is substantially constant and remains so until the powder in the cup approaches depletion.

Having thus fully described and illustrated the character of the invention, what is desired to be secured and claimed by Letters Patent is:

1. An apparatus for dispensing uniform quantities of relatively uniform particle size powders which comprises a housing, inlet means for gas, inlet means for powder, a common outlet for said gas and powder, means for rendering said housing air-tight, gas conduit means extending to the bottom of said housing communicating with said gas inlet means and having an upwardly directed orifice therein at a point adjacent the bottom of said housing, a tubular member suspended within said housing having one end positioned adjacent said orifice and adapted to receive gas into the interior thereof, said tubular member having its upper end positioned to discharge material flowing therethrough inside said housing and to the common outlet, and air distributing means at the bottom of said housing.

2. An apparatus for dispensing uniform quantities of relatively uniform particle size powders which comprises a housing, closure members for said housing, gas inlet means communicating with the interior of said housing, a recess in said closure means, a common outlet for gas and powder at one side of said recess, a gas nozzle at the opposite side of said recess in axial alignment with said common outlet, gas conduit means communicating with said gas inlet means and having an orifice therein, a tubular member suspended within said housing having one end positioned adjacent said orifice and adapted to receive gas into the interior thereof, said tubular member having its upper end positioned to direct material flowing therethrough toward the common outlet, and air distributing means at the bottom of said housing.

3. An apparatus for dispensing uniform quantities of relatively uniform particle size powders which comprises a housing, closure means for said housing, gas inlet means in said closure means, a common outlet for gas and powder, a gas nozzle communicating with said gas inlet means and discharging in the direction of said common outlet, gas conduit means depending from said closure means and extending to the bottom of said housing, an orifice in said gas conduit means adjacent the end removed from said closure means, a tubular member secured in vertical position to said gas conduit means having one end thereof positioned adjacent said orifice and adapted to receive gas from said orifice into the interior thereof, said tubular member having its upper end positioned to direct material flowing therethrough toward the common outlet, and air distributing means at the bottom of said housing communicating with said gas conduit means.

4. An apparatus for dispensing uniform quantities of relatively uniform particle size powders which comprises a housing, closure means for said housing, gas inlet means in said closure means, a common outlet for gas and powder, a gas nozzle communicating with said gas inlet means and discharging in the direction of said common outlet, gas conduit means depending from said closure means and extending to the bottom of said housing, an orifice in said gas conduit means adjacent the end removed from said closure means, a tubular member secured in vertical position to said gas conduit means having one end thereof positioned adjacent said orifice and adapted to receive gas from said orifice into the interior thereof, said tubular member having its upper end positioned to direct material flowing therethrough toward the common outlet, and tubular means adapted with a multiplicity of ports at the bottom of said housing, said tubular means being connected to said gas conduit means depending from said closure means.

5. An apparatus for dispensing uniform quantities of relatively uniform particle size powders which comprises a housing, closure means for said housing, gas inlet means in said closure means, a common outlet for gas and powder, a gas nozzle communicating with said gas inlet means and discharging in the direction of said common outlet, gas conduit means depending from said closure means and extending to the bottom of said housing, an orifice in said gas conduit means adjacent the end removed from said closure means, a tubular member secured in vertical position to said gas conduit means having one end thereof positioned adjacent said orifice and adapted to receive gas from said orifice into the interior thereof, said tubular member having its upper end positioned to direct material flowing therethrough toward the common outlet, and tubular means adapted with a multiplicity of ports directed upwardly and inwardly toward the central vertical axis of said housing at the bottom of said housing, said tubular means being of restricted cross section and connected to said gas conduit means.

6. In combination a housing, inlet means for gas and for powder, a common outlet for said gas and powder, means for rendering said housing air-tight, gas conduit means communicating with said gas inlet means and having an upwardly directed orifice therein at a point adjacent the bottom of said housing, a tubular member suspended within said housing having one end positioned adjacent said orifice and adapted to receive gas into the interior thereof, said tubular member having its upper end positioned to discharge material flowing therethrough inside said housing and to the common outlet and air distributing means at the bottom of said housing, a source of compressed air, an external gas conduit connecting said gas inlet to said source of compressed air, airflow control means in said external gas conduit, and an electrical timer of the automatic shut-off type governing the operation of said airflow control means.

7. Apparatus for dispensing substantially uniform quantities of relatively uniform particle size powder which comprises a closed housing, gas inlet means in the upper portion of said housing, a common outlet for gas and powder adjacent the upper end of said housing, a gas nozzle communicating with said gas inlet means and discharging in the direction of said common outlet, gas conduit means communicating with said gas inlet means and extending downwardly to adjacent the lower end of said housing, an upwardly-directed orifice at the lower end of said gas conduit means, a tubular member in said housing having its lower end positioned over said orifice and adapted to receive gas from said orifice into the interior thereof, said tubular member having its upper end directed to discharge toward said common outlet, and air distributing means at the bottom of said housing for aerating a powder mass in said housing.

References Cited in the file of this patent

UNITED STATES PATENTS

| Number | Name | Date |
|---|---|---|
| 719,586 | Hasbrouck | Feb. 3, 1903 |
| 2,126,924 | Rose | Aug. 16, 1938 |
| 2,208,853 | Oys | July 23, 1940 |
| 2,226,013 | Oys | Dec. 24, 1940 |